United States Patent

Nagahara et al.

[11] 3,995,941
[45] Dec. 7, 1976

[54] LIQUID CRYSTAL CELLS

[75] Inventors: Shigehiro Nagahara, Yokohama; Nobuyoshi Ichimura, Chigasaki; Yoshiro Suzuki, Tokyo, all of Japan

[73] Assignee: Asahi Glass Co., Ltd., Tokyo, Japan

[22] Filed: Nov. 1, 1972

[21] Appl. No.: 302,860

[30] Foreign Application Priority Data

Mar. 14, 1972 Japan .............................. 47-25234

[52] U.S. Cl. ........................... 350/160 LC; 65/33; 65/43
[51] Int. Cl.² ......................................... G02F 1/13
[58] Field of Search ............................ 350/160 LC

[56] References Cited

UNITED STATES PATENTS

| | | | |
|---|---|---|---|
| 3,592,526 | 7/1971 | Dreyer | 350/159 |
| 3,656,834 | 4/1972 | Haller et al. | 350/150 |
| 3,701,368 | 10/1972 | Stern | 141/1 |

*Primary Examiner*—Edward S. Bauer
*Attorney, Agent, or Firm*—Oblon, Fisher, Spivak, McClelland & Maier

[57] ABSTRACT

Here is disclosed a liquid crystal cell comprising a juxtaposed couple of planar elements at least one of which is transparent and a liquid crystal material interposed between said planar elements and sealed around the edges thereof, said cell being thermally and chemically stable, hermetically sealed and uniformly spaced, due to the use of low-melting glass as a sealant or a sealant-spacer.

6 Claims, 4 Drawing Figures

LIQUID CRYSTAL CELLS

BACKGROUND OF THE INVENTION

1. Field of the Invention

This invention relates to a liquid crystal cell and, more particularly, to a liquid crystal cell which is thermally and chemically stable, hermetically sealed and, in respect of the front and back planar elements thereof, evenly spaced.

2. Description of the Prior Art

The liquid crystal cell which has heretofore been employed in various devices including electro-optical display devices is fabricated by interposing organic spacer such as those of a polyester resin between a planar element coated with an electrically conductive film-forming material and another planar element of the same type, filling the gap defined by said planar elements with a liquid crystal composition and bonding them together with an organic cement such as an epoxy-type cement.

However, tthe conventional models of liquid crystal cell are disadvantageous in that the organic spacers and organic adhesives used therein exert untoward effects upon the liquid crystal. That is, the useful life of the liquid crystal is short and/or the cell is thermally unstable, as a consequence.

Furthermore, because the conventional liquid crystal cell comprises an organic cement as a sealant, it has the disadvantage of moisture infiltration. Thus, as the cell is operated for an extended period of time, the moisture infiltrating from the ambient atmosphere increases the water content of the liquid crystal cell with the result that bubbles are formed and the crystal is degraded.

Thus, the liquid crystal cells so far proposed are lacking in the quality of sealing materials and, at present, various sealants have been tentatively employed though they have thus far remained to be much desired in practical applications.

SUMMARY OF THE INVENTION

It is an object of this invention to provide a liquid crystal cell which is thermally and chemically stable and hermetically sealed.

Another object of the invention is to provide liquid crystal cells which are uniformly spaced in respect of the thickness of the liquid crystal sealed therein.

Those objects are now accomplished by the employment of a low-melting glass as a sealing material. A still more desirable liquid crystal cell embodying the principle of this invention is attained by selecting said low-melting glass from the group of mixtures of 90 to 40 weight percent of crystallizable low-melting glass with 10 to 60 weight percent of noncrystallizable low-melting glass, or by employing such a low-melting glass in which certain inorganic members have been incorporated.

DETAILED DESCRIPTION OF PREFERRED EMBODIMENTS

Figure 1:
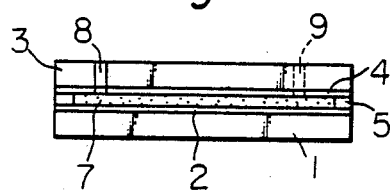
FIG. 1 is a schematic view, in section, of a liquid crystal cell according to this invention.

In accordance with this invention, a low-melting glass fusible at a temperature below the deformation temperature of base planar element is finely ground and the resulting particulate glass is admixed with an organic vehicle to prepare a paste. Using this paste and a screen which is constructed of stainless steel or other material and carrying a desired pattern, an impression of the pattern is obtained on a planar element or plate of, for example, glass. On this planar element thus printed, there is superimposed another planar element and the resulting assembly is baked. The low-melting glass to be employed according to this invention is a crystallizable or noncrystallizable glass of low melting point and, in many applications, a low-melting glass of the $PbO$ — $B_2O_3$ series or of the $ZnO$ — $B_2O_3$ — $SiO_2$ series is employed. As regards the $PbO$ — $B_2O_3$ low-melting glass, one of the $PbO$ — $B_2O_3$ — $ZnO$ series is generally employed, though glasses of the $PbO$ — $B_2O_3$ — $SiO_2$, $PbO$ — $B_2O_3$ — $Bi_2O_3$, $PbO$ — $B_2O_3$ — $TiO_2$, $PbO$ — $B_2O_3$ — $Al_2O_3$ or $PbO$ — $B_2O_3$ — $V_2O_5$ series are also useful.

In the practice of screen printing, the above-described paste is placed on a stencil which is a screen of stainless steel, polyester fiber or other material and which carries a predetermined pattern and, as a squeegee is moved across the surface of the stencil, the paste exudes through the patterned orifices of the screen to deposit on the surface of said planar element. Subsequent to the printing operation, the planar element is heated to dry the paste. Then, another planar element is superimposed on the above element so that the coated surface of the latter faces the former element and they are baked one-piece.

Because the liquid crystal cell of this invention is fabricated in the above manner, one is in the position to control the film thickness easily by selecting the proper balance of the mesh size of the screen, the viscosity of the paste and the composition and viscosity of the low-melting glass. Moreover, by printing, one may easily obtain the patterned impression desired and, at the same time, may dispense with separate spacers, for the thus-deposited low-melting glass functions not only as a sealant but also as a spacer.

In the fabrication of the liquid crystal cell according to this invention, the above-described low-melting glass may be either a crystallizable or a noncrystallizable low-melting glass as used alone, but for the manufacture of uniformly spaced liquid crystal cells on a mass-production scale, it is desirable to employ a mixture of the two types of low-melting glass.

Thus, when a mixture of crystallizable and noncrystallizable types of low-melting glass is employed, the crystallizable low-melting glass function as a spacer while the noncrystallizable low-melting glass plays the role of providing a hermetic seal, thereby giving a cell suited for use as a liquid crystal cell.

In a preferred mode of this invention, the crystallizable low-melting glass is a glass which will crystallize under the heating (temperature and time) conditions to be employed in the sealing process and, generally, use is made of glass composed of, by weight, 70 to 80% of $PbO$, 8 to 11% of $B_2O_3$, 10 to 17% of $ZnO$, 1 to 4% of $SiO_2$ and 0 to 2% of $SnO_2$. Such low-melting glass crystallizes when heated at 400° to 550° C for a period that may range from half an hour to 2 hours.

The noncrystallizable low-melting glass which is to be used in admixture with the above-described crystallizable low-melting glass is a low-melting glass which will not crystallize under the temperature and time conditions to be used in the manufacture of the cell according to this invention and, generally, use is made of a glass composed of, by weight, 70 to 80 percent of PbO, 9 to 20 percent of $B_2O_3$, 0 to 10 percent of ZnO, 1 to 8 percent of $SiO_2$, 0 to 3 percent of $SnO_2$ and 0 to 5 percent of $Al_2O_3$.

A mixed low-melting glass comprised of 90 to 40 percent by weight of the above crystallizable low-melting glass and 10 to 60 percent by weight of the above noncrystallizable low-melting glass is comminuted and the resultant particulate glass is admixed with an organic vehicle to prepare a paste. This paste is applied by, for example, screen-printing to the marginal area of a planar element. Then, on this planar element coated with the above low-melting glass is superimposed another planar element and the assembly is baked at a temperature of 400° to 550° C for about half an hour to about 2 hours. The above procedures yield a preferred liquid crystal cell embodying the principle of this invention.

The proportion of the noncrystallizable low-melting glass to be admixed with the crystallizable low-melting glass is desirably from 10 to 60 percent by weight and, for still better results, in the range of 20 to 40 percent by weight. If the proportion of the noncrystallizable low-melting glass component is below 10 percent by weight, the low-melting glass exhibits properties which are substantially comparable to the properties of crystallizable low-melting glass and tends to crystallize and harden in the course of sealing before its viscosity drops to a sufficient extent, that is to say, before it is sufficiently fluidized to attain the predetermined thickness, thereby rendering it difficult to effect sealing with the magnitude of spacing required in a liquid crystal cell being maintained with accuracy. Furthermore, the crystallizable low-melting glass component tends to be sintered and solidified into nodules without being sufficiently fluidized, failing to provide a hermetic seal. Conversely, if the proportion of said noncrystallizable low-melting glass component is in excess of 60 percent by weight, the sealing temperature is of necessity increased so that the electrically conductive film on the planar element is sometimes impaired or the coefficient of expansion of the low-melting glass becomes greater than that of the planar element to cause cracks or increase the residual strain. If the baking temperature alone is increased, the fluidity of the low-melting glass is increased and this low viscosity makes it difficult to maintain the required thickness and the glass provides an inadequate spacer. Moreover, in that case, a change in baking temperature results in a significant change in viscosity, thereby increasing the incidence of failure to obtain a reproducible spacing.

By using a low-melting glass comprising a mixture of 10 to 60 percent by weight of noncrystallizable glass with the balance of crystallizable glass, one may obviate the foregoing disadvantages and obtain an excellent liquid crystal cell. Thus, the crystallizable low-melting glass functions as a spacer and the noncrystallizable low-melting glass fills the interparticle voids of the crystallizable glass to provide a hermetic seal, that is to say, the glass plays the dual role of a spacer and a sealant.

For the low-melting glass to function as such a spacer-sealant, the particle diameter of the glass is preferably in the range of 1 to 3 $\mu$, depending upon the desired cell spacing. Thus, by selecting a particle diameter of 1 to 3 $\mu$, one may easily attain a cell spacing of 10 to 20 $\mu$, which is the desirable spacing for liquid crystal cells, particularly for those to be employed in display devices and, at the same time, one may easily obtain an even coat on the surface of a planar element by means of, say, screen-printing.

Furthermore, in the liquid crystal cell according to this invention, when it is necessary to control the spacing of planar elements, it is desirable to incorporate inorganic members in the low-melting glass particularly when a relatively large spacing is required. Thus, by incorporating inorganic members having a predetermined diameter or thickness, which is dictated by the desired cell spacing, in the low-melting glass, the cell spacing can be easily controlled and, in addition, because the spacer and sealant are integrally formed, the fabrication of cells on a high-production scale is facilitated.

The inorganic members to be incorporated in the low-melting glass in accordance with this invention include, among others, such particulate members as glass beads of soda-lime-silicate or other glass, ceramic beads such as those of alumina, metal balls, etc.; glass fiber, metallic fiber, whiskers and other fibrous materials; and fine ceramic fragments. Among those materials, a suitable one is selected to obtain the desired cell spacing, but in view of the ease of processing or fabrication, particulate materials are particularly preferred. Especially by employing glass beads measuring 5 to 50 $\mu$ in diameter as said particulate members, one may obtain the most desirable liquid crystal cell embodying the principle of this invention.

As the materials for the planar elements to be employed in the liquid crystal cell of this invention, such inorganic materials as glass and ceramics and various metals may be mentioned by way of example. Generally, the front planar element is made of a transparent material such as glass and the back planar element is made of a transparent or reflective material.

When the cell is filled with a nematic liquid crystal its planar elements are generally made of one of the above-mentioned materials on which a transparent electrically conductive film, such as a film of tin oxide and/or indium oxide, has been deposited by a vacuum-deposition technique. As the back planar element, one may also employ an element carrying a reflective electrically conductive film such as that of, say, aluminum.

The electrically conductive film on the planar element material is exemplified by one which has been applied all over the surface of the planar substrate one which has been applied in accordance with desired pattern such as digits or figures, or one which is in the form of an X – Y matrix adapted to display letters, digits, picture elements, etc. Thus, the practice of this invention encompasses any and all of the planar elements which have heretofore been used or known.

The liquid crystal cell of this invention will be further described in detail, reference being had to the accompanying drawings.

FIG. 1 shows a liquid crystal cell which comprises a transparent glass plate 1 to which a transparent electrically conductive film 2 has been applied, a transparent glass plate 3 to which a transparent electrically conductive film has been applied, a low-melting glass 5 providing both a spacing and a seal therebetween, and a liquid crystal 7 which has been filled into the spacing defined by said plates and sealant. There are two gates; one 8 for filling a liquid crystal 7 while the other 9 for gas vent. After completion of the filling, said gates 8 and 9 are sealed with an adequate sealant.

Figure 2:
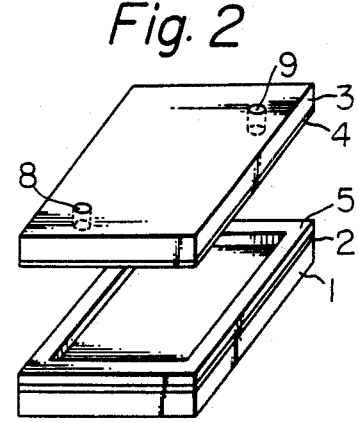
FIG. 2 is a pre-assembly view, in perspective, of the same liquid crystal cell.

FIG. 2 is a schematic diagram illustrating the preassembly state of the cell disclosed in FIG. 1. In this embodiment, the low-melting glass 5 is deposited by screen-printing exclusively on the marginal area of glass plate 1 and, then, the other glass plate 3 is superimposed on the printed surface of plate 1. Thereafter, the resulting assembly is baked one-piece.

Figure 3:
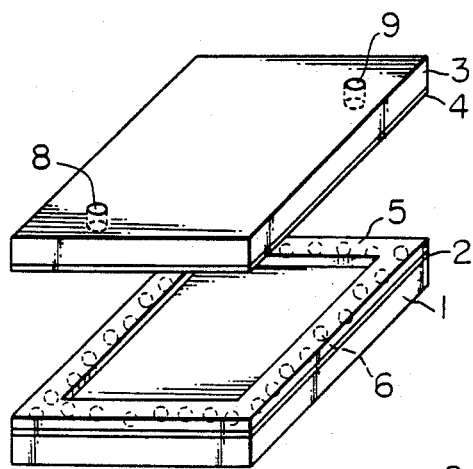
FIG. 3 is a perspective view showing still another embodiment of the liquid crystal cell according to this invention.

FIG. 3 shows a still another embodiment, being a pre-fabrication view of the resulting cell. In this embodiment, a low-melting glass 5 in which particulate members 6 have been incorporated is deposited on the marginal area of a transparent glass plate 1 carrying a transparent electrically conductive film 2 and, then, another transparent glass plate carrying a transparent electrically conductive film 4, which is similar to plate 1, is superimposed on plate 1, followed by baking them together.

tate as a vehicle to prepare a paste having a viscosity of 30,000 centipoises. Then, a glass plate measuring 50 × 50 × 1.6 millimeters is screen-printed using the above paste, a stainless-steel screen (325 meshes) carrying a predetermined pattern and a squeegee of flexible polyurethane. On the glass plate thus screen-printed, there is superimposed another glass plate of the same material and the assembly is based to produce a cell according to the following baking schedule.

| Heating-cooling cycle | Hold time |
| --- | --- |
| Room temperature to 300° C (5° C/min) | 300° C, 30 min |
| 300° C to 520° C (5° C/min) | 520° C, 30 min |
| 520° C to room temperature (5° C/min) | |

The resulting cell spacing is 12 $\mu$ and the printed area of the cell remains transparent. The gate for liquid crystal is closed and the cell is immersed in silicone oil at 200° C to test the sealing effect. The result shows that no bubbles are formed, attesting to adequate sealing.

Table 1

| Glass No. | Composition(%) | | | | | Coefficient of expansion (50–250° C) | Softening Temperature |
| --- | --- | --- | --- | --- | --- | --- | --- |
| | PbO | $B_2O_3$ | $SiO_2$ | $Al_2O_3$ | ZnO | | |
| 1 | 72 | 17 | 3 | 2 | 16 | $85 \times 10^{-7}/C$ | 435° C |
| 2 | 75 | 12 | 3 | 10 | — | $84 \times 10^{-7}/C$ | 440° C |
| 3 | 76 | 10 | 3 | — | 11 | $90 \times 10^{-7}/C$ | 380° C |

Figure 4:
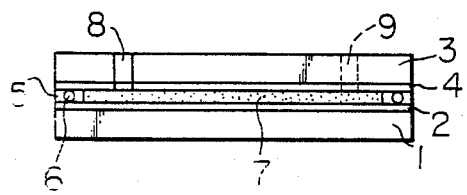
FIG. 4 is a sectional view showing the construction of a liquid crystal cell obtainable by the embodiment of FIG. 3.

FIG. 4 is a view showing the sectional structure of planar elements fabricated into a cell. Gates for filling 8 a liquid crystal composition and for gas vent 9 are usually provided on the back or lateral side of the liquid crystal cell.

Since, as described above, the liquid crystal cell according to this invention is such that glass, which is an inorganic material, is used both as a sealant and a spacer, it is stable both chemically and thermally and, consequently, allows the liquid crystal sealed therein to function stably.

Furthermore, because the spacer member of the liquid crystal cell of this invention consists in a fused-on layer of low-melting glass, it is free from degradation, the disadvantage which is often encountered with conventional organic spacers. Moreover, a completely hermetic seal is ensured. Thus, this invention enables one to manufacture highly reliable liquid crystal cells.

Furthermore, by employing a low-melting glass comprising a mixture of crystallizable low-melting glass and noncrystallizable low-melting glass or a low-melting glass in which certain inorganic members have been incorporated, one may easily control the cell spacing, which is one of the most important considerations in the fabrication of liquid crystal cells and, moreover, may easily obtain liquid crystal cells having a uniform spacing on a mass-production scale.

The following examples are further illustrative of this invention.

EXAMPLE 1

Low-melting glass No. 1 (Table 1) is comminuted to a mean particle diameter of 1.5 $\mu$ and the resulting particulate glass is admixed with n-butylcarbitol ace-

EXAMPLE 2

Low-melting glass No. 2 (Table 1) is comminuted to a mean particle diameter of 1.6 $\mu$ and the resulting particulate glass is admixed with n-butylcellosolve acetate as a vehicle to prepare a paste. Using this paste and a stainless-steel screen of 350 meshes, a glass plate measuring 50 × 50 × 1.6 millimeters is screen-printed at four corners and in areas each measuring 5 millimeters square and the printed plate is baked according to the same temperature schedule as that given in Example 1. The thickness of the layer of glass thus deposited is 8 $\mu$. On this printed plate is superimposed another glass plate of the same type and the edges around the assembly are sealed with a paste having a viscosity of 10,000 poises. This paste is obtainable by comminuting low-melting glass No. 3 (Table 1) to a mean particle size of 1.6 $\mu$ and admixing the resulting particulate glass with amyl acetate as a vehicle. The entire assembly is then baked under the following conditions. Heated from room temperature to 200° C at the rate of 3° C per minute; from 200° C to 430° C at the rate of 7.5° C per minute; and held at 430° C for 1 hour. The softening point of low-melting glass No. 2 (Table 1) is 440° C and the baking temperature of 430° C is below that point. Therefore, the spacing remains to be 8 $\mu$.

EXAMPLE 3

Low-melting glass No. 3 (Table 1) is comminuted to a mean particle diameter of 1.4 $\mu$ and the particulate glass is admixed with n-butylcarbitol acetate to prepare a paste having a viscosity of 30,000 centipoises. Using this paste and a stainless-steel screen of 30 meshes, a glass plate, 50 × 50 × 1.6 millimeters, is screen-printed around its edges (4 millimeters in width). On the plate thus printed is superimposed another plate of the same material as above and the assembly is baked under the baking conditions set forth in Example 2 for low-melting glass No. 3.

EXAMPLE 4

Each of the low-melting glasses listed in Table 2 is admixed with n-butylcarbitol acetate to prepare a paste and using this paste and a stainless-steel screen of 300 meshes, a glass plate, 40 × 40 × 3 millimeters, which carries an electrically conductive surface film, is screen-printed around its marginal area. On the glass plate thus printed is superimposed another glass plate of the same type which also carries an electrically conductive film similar to that carried by the first-mentioned plate and the assembly is baked according to the following schedule: Heated to 400°–500° C at the rate of 3° C/min to 10° C/min and, then, held at 400°–500° C for 30 min to 2 hours. Thereafter, each sample is allowed to cool.

To evaluate the condition of seal around the edges, the cell spacing and yield, 10 cells for each sample are fabricated. The results are set forth in Table 3.

Table 2

| Composition (% by weight) | Sample No. 1 | No. 2 | No. 3 | No. 4 |
|---|---|---|---|---|
| PbO | 77 | 71 | 79 | 72 |
| $B_2O_3$ | 9 | 9 | 10 | 18 |
| ZnO | 12 | 16 | 4 | 5 |
| $SiO_2$ | 2 | 2 | 3 | 3 |
| $SnO_2$ | | 2 | 2 | 2 |
| $Al_2O_3$ | | | 2 | |
| Crystallizability | Crystallizable | | Noncrystallizable | | low-melting glass. This paste is applied to the marginal area of a glass plate measuring 100 × 100 × 8 millimeters. On the glass plate thus processes is superimposed a glass plate of the same type and size. The assembly is dried at 150° C for 30 minutes after which time the temperature is raised to 430° C at the rate of 5° C/min while the assembly is pressed with a stainless steel block having a weight of 1 kg and then, placed under the same temperature conditions to remain at 430° C with the same pressure for 1 hour. Thereafter, the cell is allowed to cool in the electric furnace and the spacing of the product liquid crystal cell is measured. The cell spacing is 19 $\mu$. The gates provided in one of the glass plates for filling a liquid crystal composition are closed and the gas-tightness of the spacing is tested by a He leak detector. The result shows that the amount of leak is below $10^{-11}$ atm. cc/sec., indicating that the product of this example is an extremely useful liquid crystal cell.

What we claim is:

1. A liquid crystal cell comprising a couple of planar elements juxtaposed in parallel at a predetermined spacing and a liquid crystal composition interposed between said planar elements, the edges of the cell being sealed with a sealant, characterized in that said sealant is a low-melting glass comprising a mixture of crystallizable low-melting glass and noncrystallizable low-melting glass.

2. A liquid crystal cell as claimed in claim 1, wherein said sealant is a low-melting glass comprising a mixture of 90 to 40 percent by weight of crystallizable low-melting glass and 10 to 60 percent by weight of noncrystallizable low-melting glass.

3. A liquid crystal cell as claimed in claim 1, wherein said sealant is a low-melting glass comprising a mixture of 80 to 60 percent by weight of crystallizable low- Table 3

| | 1 | 2 | 3 | 4 | 5 | 6 | 7 | 8 | 9 | 10 |
|---|---|---|---|---|---|---|---|---|---|---|
| Low-melting glass | No.1 | No.2 | No.3 | No.3 | No.4 | No.1,70% No.3,30% | No.1,70% Re-No.3,30% melted | No.2,80% No.4,20% | No.2,60% No.4,40% | Quartz glass 50% No.4, 50% |
| Mean particle diameter ($\mu$) | 1.9 | 2.3 | 1.7 | 1.7 | 2.3 | No.1,1.9 No.3,1.7 | 1.8 | No.2,2.3 No.4,2.3 | No.2,2.3 No.4,2.3 | Quartz glass 2.1 No.4, 2.3 |
| Baking temperature (° C) | 460 | 520 | 460 | 440 | 520 | 460 | 460 | 520 | 520 | 520 |
| Hold time (hrs.) | 1 | 1 | 1 | 1 | 1 | 1 | 1 | 1 | 1 | 1 |
| Mean cell spacing ($\mu$) | 16 | 21 | 12 | 15 | 16 | 15 | 14 | 20 | 19 | 22 |
| Gap variance ($\mu$) | 3 | 3 | 6 | 4 | 7 | 3 | 4 | 2 | 4 | 4 |
| Number of cells with distorted edges | 0 | 0 | 6 | 1 | 4 | 0 | 1 | 0 | 0 | 2 |
| Number of cells with gas leaks (Helium gas detector) | 4 | 5 | 0 | 3 | 1 | 0 | 2 | 1 | 0 | 1 |
| Yield of acceptable cells (%) | 60 | 50 | 40 | 60 | 60 | 100 | 70 | 90 | 100 | 70 |

EXAMPLE 5

A low-melting glass composed of 80% PbO, 10% $B_2O_3$, 4% ZnO, 2% $SiO_2$, 2% $SnO_2$ and 2% $Al_2O_3$ is comminuted to a mean particle diameter of 1.5$\mu$ and the resulting particulate glass is admixed with n-butylcarbitol acetate as a vehicle to prepare a paste of 30,000 poises in viscosity. Spherical glass beads (20 $\mu$ ± 2 $\mu$; softening point 690° C) are selected from among commercial products and are incorporated in the above paste in the proportion of 50 beads per gram of melting glass and 20 to 40 percent by weight of noncrystallizable low-melting glass.

4. A liquid crystal cell as claimed in claim 1, wherein said crystallizable low-melting glass is composed of, by weight, 70 to 80 percent of PbO, 8 to 11 percent of $B_2O_3$, 10 to 17 percent of ZnO, 1 to 4 percent of $SiO_2$ and 0 to 2 percent of $SnO_2$.

5. A liquid crystal cell as claimed in claim 1, wherein said noncrystallizable low-melting glass is composed of, by weight, 70 to 80 percent of PbO, 9 to 20 percent of $B_2O_3$, 0 to 10 percent of ZnO, 1 to 8 percent of $SiO_2$, 0 to 3 percent of $SnO_2$ and 0 to 5 percent of $Al_2O_3$.

6. A liquid crystal cell as claimed in claim 1, wherein said crystallizable low-melting glass is composed of, by weight, 70 to 80 percent of PbO, 8 to 11 percent of $B_2O_3$, 10 to 17 percent of ZnO, 1 to 4 percent of $SiO_2$ and 0 to 2 percent of $SnO_2$ and said noncrystallizable low-melting glass is composed of, by weight, 70 to 80 percent of PbO, 9 to 20 percent of $B_2O_3$, 0 to 10 percent of ZnO, 1 to 8 percent of $SiO_2$, 0 to 3 percent of $SnO_2$ and 0 to 5 percent of $Al_2O_3$.

* * * * *